United States Patent
Miya et al.

(10) Patent No.: US 6,351,458 B2
(45) Date of Patent: *Feb. 26, 2002

(54) CDMA CELLULAR WIRELESS COMMUNICATION SYSTEM

(75) Inventors: Kazuyuki Miya, Kawasaki; Osamu Kato, Yokohama, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,978

(22) Filed: Sep. 22, 1997

(51) Int. Cl.[7] .............................................. H04Q 7/00
(52) U.S. Cl. ...................................... 370/330; 370/335
(58) Field of Search ................................ 370/276, 277, 370/278, 279, 280, 281, 294, 295, 315, 319, 320, 321, 324, 328, 329, 330, 331, 335, 336, 342, 343, 345, 350; 375/140, 146, 147

(56) References Cited

U.S. PATENT DOCUMENTS

| | | | | |
|---|---|---|---|---|
| 5,602,836 A | * | 2/1997 | Papadopoulos et al. | 370/280 |
| 5,689,502 A | * | 11/1997 | Scott | 370/281 |
| 5,732,076 A | * | 3/1998 | Ketseoglou et al. | 370/347 |
| 5,793,757 A | * | 8/1998 | Uddenfeldt | 370/335 |
| 5,802,046 A | * | 9/1998 | Scott | 370/280 |
| 5,850,393 A | * | 12/1998 | Adachi | 370/335 |
| 5,933,421 A | * | 8/1999 | Alamouti et al. | 370/330 |
| 5,943,362 A | * | 8/1999 | Saito | 375/200 |
| 5,956,326 A | * | 9/1999 | Magana | 370/277 |
| 6,175,744 B1 | * | 1/2001 | Esmailzadeh et al. | 455/522 |

* cited by examiner

Primary Examiner—Kwang B. Yao
(74) Attorney, Agent, or Firm—Stevens, Davis, Miller & Mosher, LLP

(57) ABSTRACT

Wireless communication equipment for a CDMA cellular wireless system operating FDD communication and TDD communication of a simplified circuit structure reduces interference with a communication channel. A wireless transmitter for an SS-DS CDMA cellular wireless system operating FDD communications and TDD communications includes an FDD pilot channel for outputting pilot channel signals in an FDD band, an FDD control channel for outputting control channel signals in the FDD band, FDD communications channels for outputting communications channel signals in the FDD band, a TDD pilot channel for outputting pilot channel signals in a TDD band, and a TDD communications channel for outputting communication channel signals in the TDD band. The wireless transmitter does not have a TDD control channel for outputting control channel signals in the TDD band. Control channel signals are transmitted only in the FDD band.

17 Claims, 9 Drawing Sheets

CDMA CELLULAR WIRELESS COMMUNICATION SYSTEM

BACKGROUND OF THE INVENTION

1. Field of the Invention

The present invention relates to a wireless transmitter, a wireless receiver, and wireless communication equipment of CDMA system for digital cellular mobile communication or the like, and more particularly, to ones with which both FDD (Frequency Division Duplex) and TDD (Time Division Duplex) can be operated in a simplified construction and efficient manner.

2. Description of the Related Art

In digital cellular mobile communication, multiple access systems in which a plurality of mobile stations simultaneously connect with a circuit using the same frequency band are adopted. CDMA (Code Division Multiple Access), one of the multiple access systems, is a technique for carrying out multiple connection utilizing spread spectrum communication where a spectrum of an information signal is spread over a sufficiently wide band compared with the original bandwidth in transmission. Thus, CDMA is sometimes referred to as Spread Spectrum Multiple Access (SSMA). As a method of spreading a spectrum, Spread Spectrum-Direct Sequence (SS-DS), that is, a system where an information signal is multiplied directly by a spread series code to spread the spectrum of the information signal.

It is an object of the present invention to provide a CDMA cellular mobile communication system in which both FDD (Frequency Division Duplex) and TDD (Time Division Duplex) methods can be used for transmission and reception of communication signals.

SUMMARY OF THE INVENTION

In wireless communication, there are two systems: a system where transmission and reception are allotted to different radio frequencies (FDD: Frequency Division Duplex); and a system where the same frequency is used and transmission and reception are allotted according to time sharing (TDD: Time Division Duplex). As shown in FIG. 9, in FDD, a radio frequency F1 (801) for a down circuit (from a base station to a mobile station) is different from a radio frequency F2 (802) for an up circuit (from a mobile station to a base station). On the other hand, in TDD, which is sometimes referred to as the ping-pong system, the same radio frequency F3 (803) is time shared to transmission/reception to carry out communication.

In FPLMTS (Future Public Land Mobile Telecommunication Systems) which is now being standardized as systems for mobile communication in the next generation with ITU being at the center, 1885–2025 MHz and 2110–2200 Mhz are allotted as radio frequencies for FPLMTS bands. For example, the above two frequency bands are to be allotted to the FDD band and the TDD band, it may be considered that 2110–2200 MHz and 1885–1975 MHz, each having a bandwidth of 90 MHz, are allotted to the FDD band and the remaining low frequency band, that is, 1975–2025 Mhz having a bandwidth of 50 MHz is allotted to the TDD band. In this case, as a cellular wireless system, it may be considered that the two communication systems, FDD and TDD, are operated in the same area and by the same base station.

Accordingly, the present invention provides a CDMA cellular wireless communication system which can operate both FDD and TDD.

According to the present invention, there is provided a CDMA cellular wireless communication system which comprises a base station, a plurality of mobile stations for communicating with the base station, FDD (Frequency Division Duplex) communication means between the base station and the mobile stations using different radio frequencies for transmission and reception and TDD (Time Division Duplex) between the base station and the mobile stations using a same frequency for transmission and reception between the base station and the mobile stations.

DETAILED DESCRIPTION OF THE INVENTION

A CDMA digital cellular wireless telecommunication system according to the present invention will now be described in greater detail with reference to the accompanying drawings.

First, a detection system adopted by a CDMA digital cellular wireless communication system according to the present invention is described in the following.

A synchronous detection system and a delayed detection system are detection systems used in digital communication. The synchronous detection system has more excellent static characteristics than those of the delayed detection system, and has the lowest $E_b/I_0$ necessary for obtaining a certain average bit error rate (BER).

Figure 11:
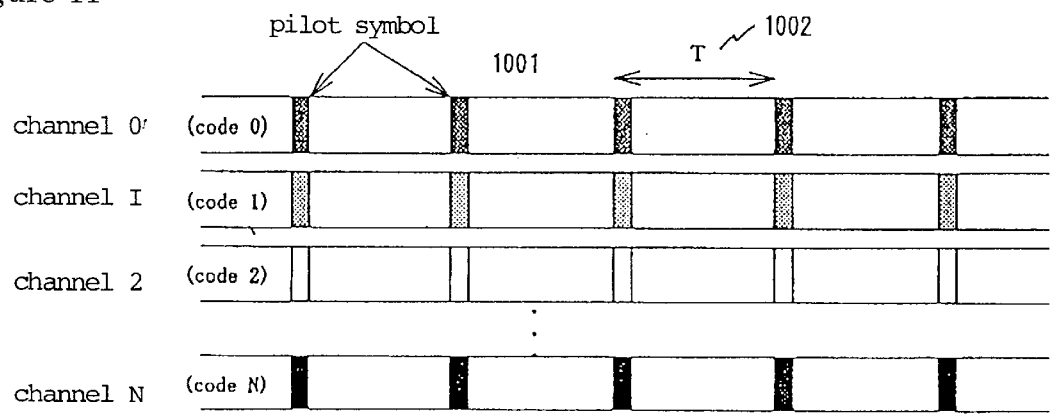
FIG. 11 is a channel format illustrating an example of conventional interpolating of pilot symbols.

As a detection system for compensating for distortion of a transmission signal due to fading, an interpolating-type synchronous detection system has been proposed (Seiichi Sanpei, "System for Compensating Fading Distortion of 16 QAM for Terrestrial Mobile Communication," The Transactions of The Institution of Electronics, Information and Communication Engineers, B-2 Vol. J72-B-2, No. 1, pp. 7–15, 1989). According to this system, pilot symbols are periodically interpolated in information symbols to be transmitted, the transfer function (that is, the status of the circuit) is estimated, and detection is carried out. Further, a system where the above detection system is applied to SS-DS CDMA has been proposed (Higashi, Taguchi, and Ohno, "Characteristics of Interpolating-type Synchronous Detection RAKE in DS/CDMA," Technical Report of IEICE, RCS94–98, 1994). FIG. 11 illustrates an example of a channel format where pilot symbols 1001 for synchronous detection are interpolated. The pilot symbols are interpolated with a period T (1002) with respect to every channel.

Figure 12:
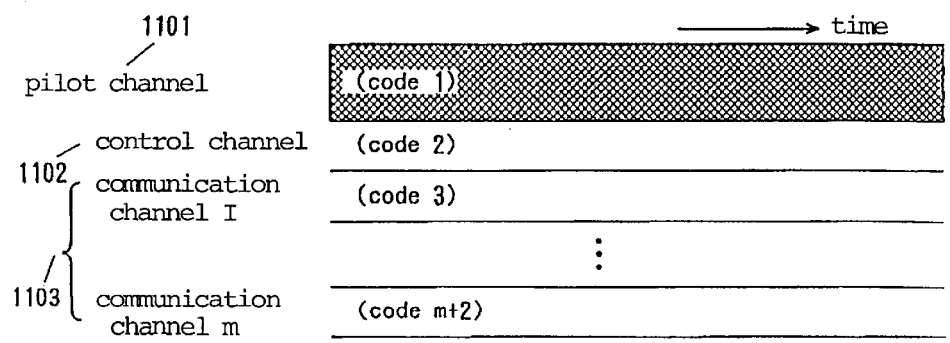
FIG. 12 is a channel format illustrating an example of conventional multiplexing of a pilot channel.

Still further, as a system allowing synchronous detection in SS-DS CDMA, there is one where a pilot channel is utilized. In the system, one channel (for a spread code) is always used to transmit reference signals for detection, independently of a channel for transmitting information data. FIG. 12 illustrates an example of a channel format where a pilot channel is multiplexed. The figure shows that a pilot channel 1101, a control channel 1102, and a communication channel 1103 are multiplexed.

Figure 7:
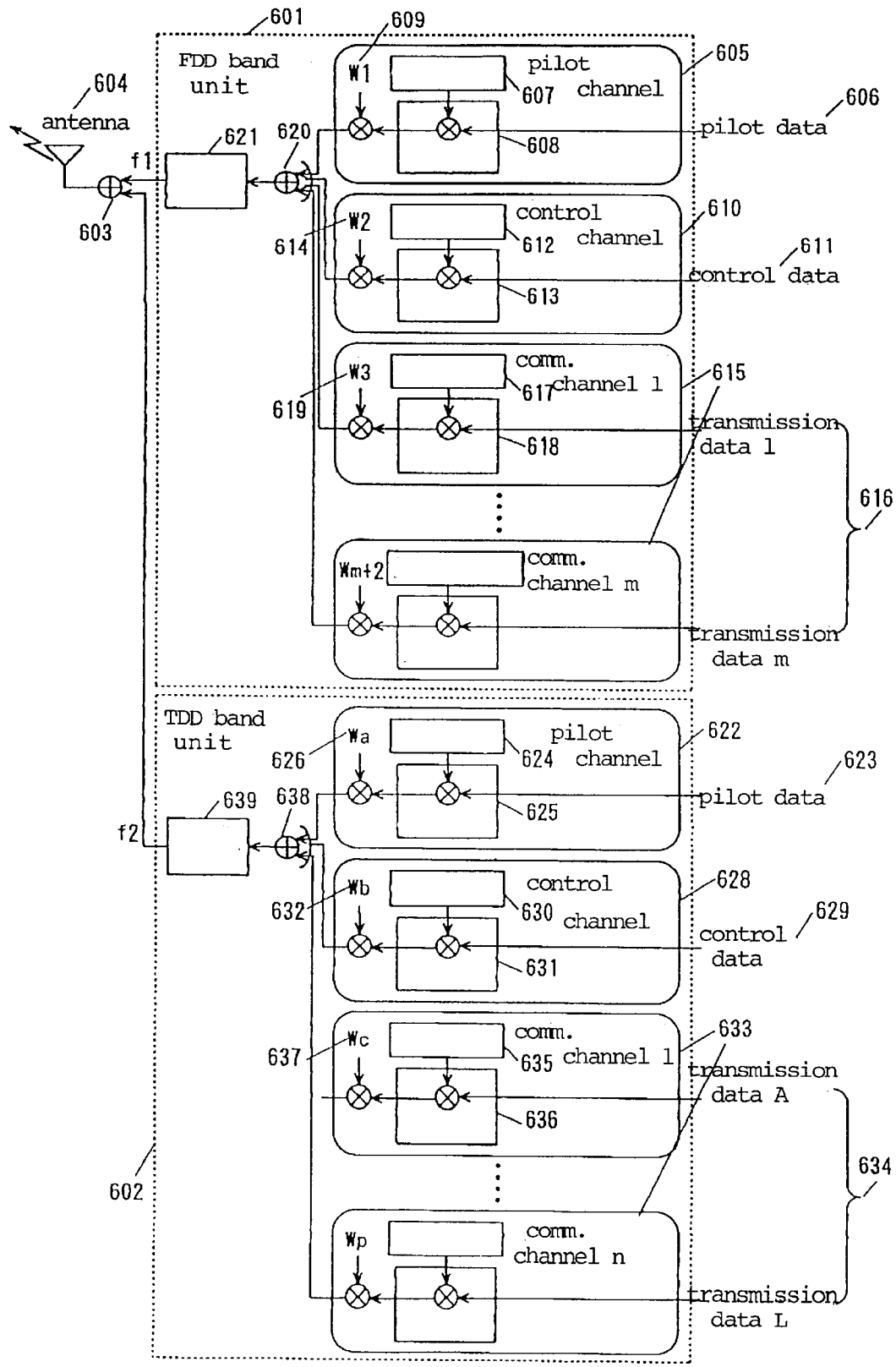
FIG. 7 is a block diagram illustrating a general construction of a CDMA cellular wireless transmitter according to the present invention.
Figure 10:
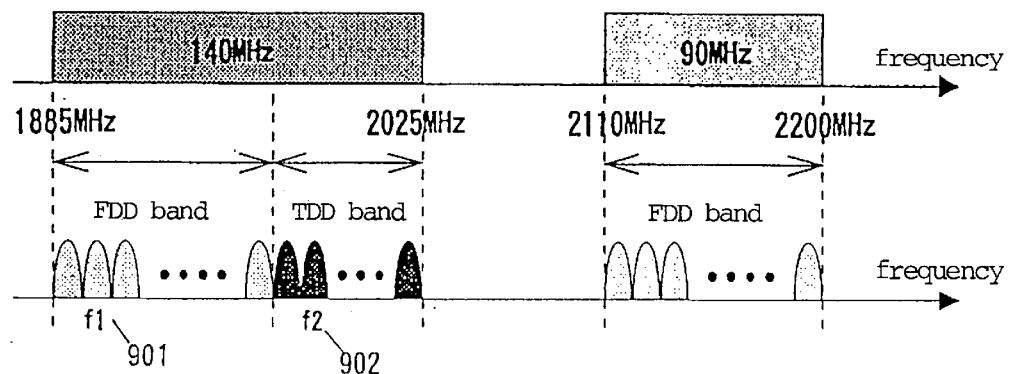
FIG. 10 illustrates an example of a case where radio frequencies are allotted to FDD communication and TDD communication schemes according to the present invention.

With such techniques, a CDMA cellular wireless transmitter (base station) for operating FDD communication and TDD communication according to the present invention may be constructed as shown in FIG. 7. It is to be noted that the FDD band and the TDD band in the radio frequency band are allotted as shown in FIG. 10. The transmitter shown in FIG. 7 is an example of a wireless transmitter for outputting f1 (901) and f2 (902) among a plurality of carrier frequencies of the respective bands shown in FIG. 10. Further, it is a system where the pilot channel is multiplexed with regard to both of the bands.

The wireless transmitter comprises an FDD band unit 601 for transmitting multiplexed signals with its spectrum spread at the frequency f1, a TDD band unit 602 for transmitting multiplexed signals with their spectrum spread at the frequency f2, an adder 603 for adding the both, and an antenna 604. The FDD band unit 601 comprises a pilot channel 605 for spreading and outputting pilot data 606, a control channel 610 for spreading and outputting control data 611, communication channels 1–m (615) for spreading and outputting respective transmission data 1–m, an adder 620 for adding output of the respective channels, and a wireless transmitting portion 621 for converting output of the adder 620 into signals at the frequency f1.

The TDD band unit 602 comprises a pilot channel 622 for spreading and outputting pilot data 623, a control channel 628 for spreading and outputting control data 629, communication channels 1–n (633) for spreading and outputting respective transmission data A–L, an adder 638 for adding output of the respective channels, and a wireless transmitting portion 639 for converting output of the adder 638 into signals at the frequency f2.

The channels 605, 610, 615, 622, 628, and 633 of the FDD band unit 601 and the TDD band unit 602 have spread circuits 608, 613, 618, 625, 631, and 636 for spreading the data by multiplying the data by spread codes 607, 612, 617, 624, 630, and 635 set for the respective channels, and multipliers for multiplying the spread data by weights W1, W2, W3, Wm+2, Wa, Wb, Wc, and Wp for controlling transmission power, respectively.

In the wireless transmitter, the pilot channel 605 spreads the pilot data 606 with the spread circuit 608 using the spread code 1 (607), multiplies the spread data by the weight W1 (609), and then outputs the data. The control channel 610 spreads the control data 611 with the spread circuit 613 using the spread code 2 (612), multiplies the spread data by the weight 614, and then outputs the data. The communication channel 615 spreads the respective transmission data 1–m (616) with the respective spread circuits 618 using the respective spread codes 617, multiplies the spread data by the respective weights 619, and then outputs the data. The data outputted from the respective channels are multiplexed by the multiplexing circuit 620, up converted by the wireless transmitting portion 621, and transmitted from the antenna 604.

In the TDD band unit 602, similarly, the pilot channel 622 spreads the pilot data 623 with the spread circuit 625 using the spread code 1 (624), multiplies the spread data by the weight Wa (626), and then outputs the data. The control channel 628 spreads the control data 629 with the spread circuit 631 using the spread code 2 (630), multiplies the spread data by the weight 632, and then outputs the data. The communication channel 633 spreads the respective transmission data A–L (634) with the respective spread circuits 636 using the respective spread codes 635, multiplies the spread data by the respective weights 637, and then outputs the data. The data outputted from the respective channels are multiplexed by the multiplexing circuit 638, up converted by the wireless transmitting portion 639, and transmitted from the antenna 604.

In the transmitter, the spread codes used in FDD and TDD may be different from each other. The transmitting antenna for the radio frequency f1 and that for the radio frequency f2 may be separately provided. Further, since the pilot data 606 and 623 do not necessarily have to transmit information, these data may be non-modulated data (all zeros, or, all ones). It is to be noted that the control channels of the FDD band unit and the TDD band unit are used when communication is being waited for and communication is started (the circuit is connected), and, during communication, control data is transmitted as a part of transmission data of the communication channels.

Figure 8:
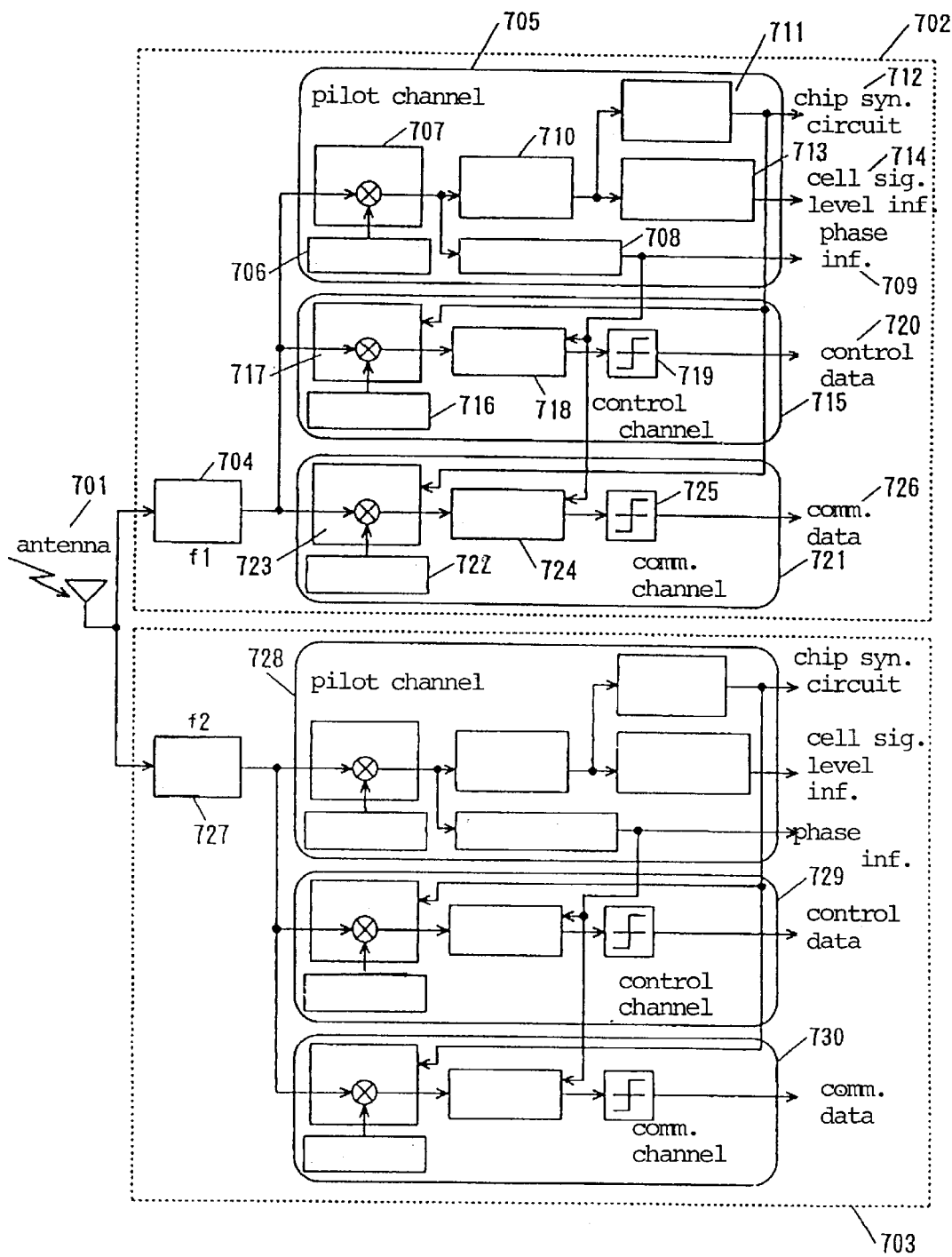
FIG. 8 is a block diagram illustrating a general construction of a CDMA cellular wireless receiver according to the present invention.
Figure 9:
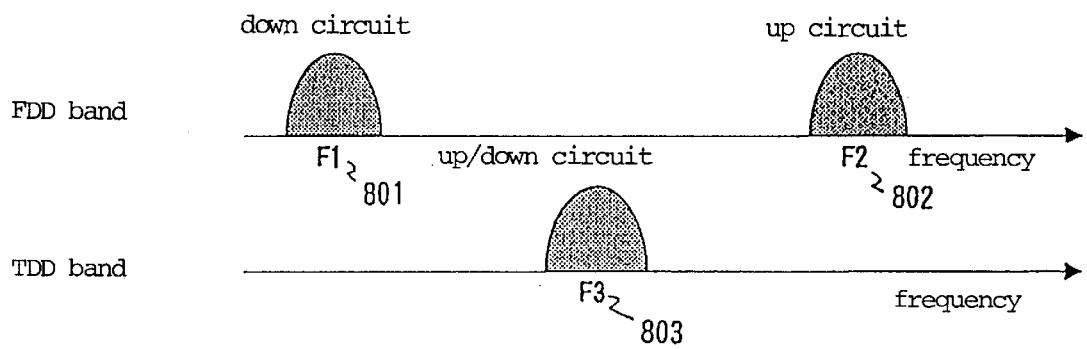
FIG. 9 illustrates an example of FDD communication and TDD communication techniques used in the present invention.

FIG. 8 illustrates an example of a general construction of a CDMA cellular wireless receiver according to the present invention for receiving signals in both of the FDD band and the TDD band. The wireless receiver comprises an antenna 701 for receiving signals, an FDD band unit 702 for processing received signals in the FDD band (at the radio frequency f1), and a TDD band unit 703 for processing received signals in the TDD band (at the radio frequency f2). The FDD band unit 702 and the TDD band unit 703 are similarly constructed and comprise wireless receiving portions 704 and 727 for down converting received signals, pilot channels 705 and 728 for processing received signals to output phase information 709, chip synchronization signals 712, and cell signal level information 714, control channels 715 and 729 for outputting control data 720, and communication channels 721 for outputting communication data 726, respectively.

Each of the pilot channels 705 and 728 comprises a correlation circuit 707 for despreading by means of multiplying the received signals by a spread code 706, a phase estimation circuit 708 for finding the phase information 709 of the received signals from the output of the despreading, a power detection circuit 710 for operating reception power with respect to each sampling, a chip synchronous circuit 711 for finding chip synchronization signals by integrating the output of the power detection circuit 710, and a cell monitor circuit 713 for, from the output of the power detection circuit 710, outputting cell signal level information representing signal levels with regard to respective cells using the same spread code. The control channels 715 and 729 and the communication channels 721 and 730 comprises correlation circuits 717 and 723 for despreading by means of multiplying the received signals by spread codes 716 and 722, detection circuits 717 and 723 for carrying out synchronous detection with respect to the despreaded signals based on the phase information 709, and binary decision circuits 719 and 725 for deciding the output of the detection circuits 718 and 724 and outputting the control data 720 or the communication data 726, respectively.

In the receiver, among signals received from the antenna 701, signals in the FDD band (at the radio frequency f1) are processed by the FDD band unit 702 while signals in the TDD band (at the radio frequency f2) are processed by the TDD band unit 703.

Signals in the FDD band are down converted by the wireless receiving portion 704. In the pilot channel 705, the correlation circuit 707 despreads signals outputted by the wireless receiving portion 704 using a spread code 706. A phase estimation circuit 708 detects the phase information 709 of the received signals from the despreaded output to send it to the detection circuits 718 and 724 of the control channel 715 and the communication channel 721.

In the control channel 715, the correlation circuit 717 for despreading of signals outputted by the wireless receiving portion 704 using a spread code 2 (716), the detection circuit 718 carries out synchronous detection with regard to the despreaded signals based on the phase information 709, and the binary decision circuit 719 decides the detected data to output the control data 720.

In the communication channel 726, the correlation circuit 723 despreads signals outputted by the wireless receiving portion 704 using a spread code i (722), the detection circuit 724 carries out synchronous detection with regard to the despreaded signals based on the phase information 709, and the binary decision circuit 725 decides the detected data to output the communication data 726.

The despreaded output of the correlation circuit 707 of the pilot channel 705 is inputted to the power detection circuit 710. The power detection circuit 710 operates reception power with respect to each sampling (phase). The chip synchronous circuit 711 outputs the chip synchronization signals 712 by integrating the output of the power detection circuit 710 with respect to a certain time constant (filtering). The chip synchronization signals are inputted to the correlation circuit 717 of the control channel 715 and the correlation circuit 723 of the communication channel 721 to determine the phases of the despreading using the spread codes carried out by these correlation circuits.

In case a plurality of cells use the same spread code 1 (706) and transmit pilot channel signals with phase shift, the cell monitor circuit 713 generates, based on the output of the power detection circuit 710, the cell signal level information 714 representing levels of received pilot signals outputted by the base station of the cells.

Figure 13:
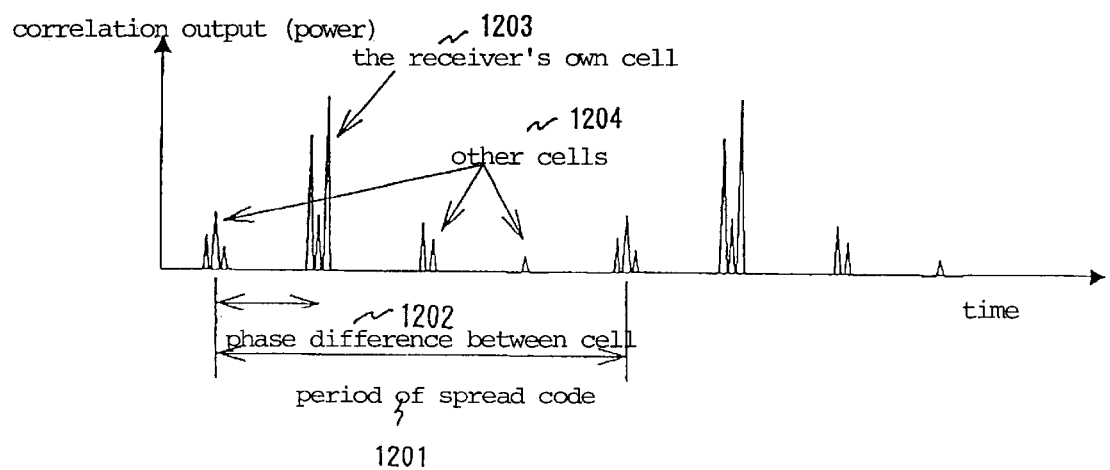
FIG. 13 illustrates an example of cell signal level information.

FIG. 13 illustrates an example of the output of the power detection circuit 710 in case phase difference (1202) of ¼ of a period (1201) of the spread code is provided between the cells. Since the same spread code 1 is used among the cells, by shifting the phases of the despreading of the correlation circuit 707, not only the level of the received signals of the receiver's own cell but also the levels of the received signals of other cells can be detected.

It is to be noted that the transmission power of the pilot channel necessary for acquiring the chip synchronization signals and the cell signal level information may be lower than the power necessary for the synchronous detection, since the output of the power detection circuit 710 is integrated in the chip synchronous circuit 711 and the cell monitor circuit 713.

Process in the TDD band unit 703 is similar to that in the FDD band unit 702. Signals in the TDD band are down converted by the wireless receiving portion 727, and processed similarly to signals in the FDD band in the pilot channel 728, the control channel 729, and the communication channel 730 to be decoded.

However, since the above-mentioned cellular wireless transmitter embodying the present invention has control channels both for the FDD band and for the TDD band, a transmission circuit is necessary for each of the two bands, leading to complexity of the construction of the transmitter. Further, there are problems such as that a spread code is required to be allotted to both of the control channel for the FDD band and the control channel for the TDD band, and that interference increases all the more for the control channel in each of the bands, resulting in degradation of the quality of the pilot channels and the communication channels.

Further, with respect to the above illustrated CDMA cellular wireless receiver, there is also a problem that a circuit is necessary both for receiving the FDD band signals and for receiving the TDD band signals, leading to complexity of the construction of the receiver.

Accordingly, the present invention is made to provide an improvement for CDMA cellular wireless system operating FDD communication and TDD communication which is simple in circuit construction and with which interference with the communication channels is reduced, allowing enhanced communication quality.

Specific embodiments of the present invention are now described in the following with reference to the drawings.

Figure 1:
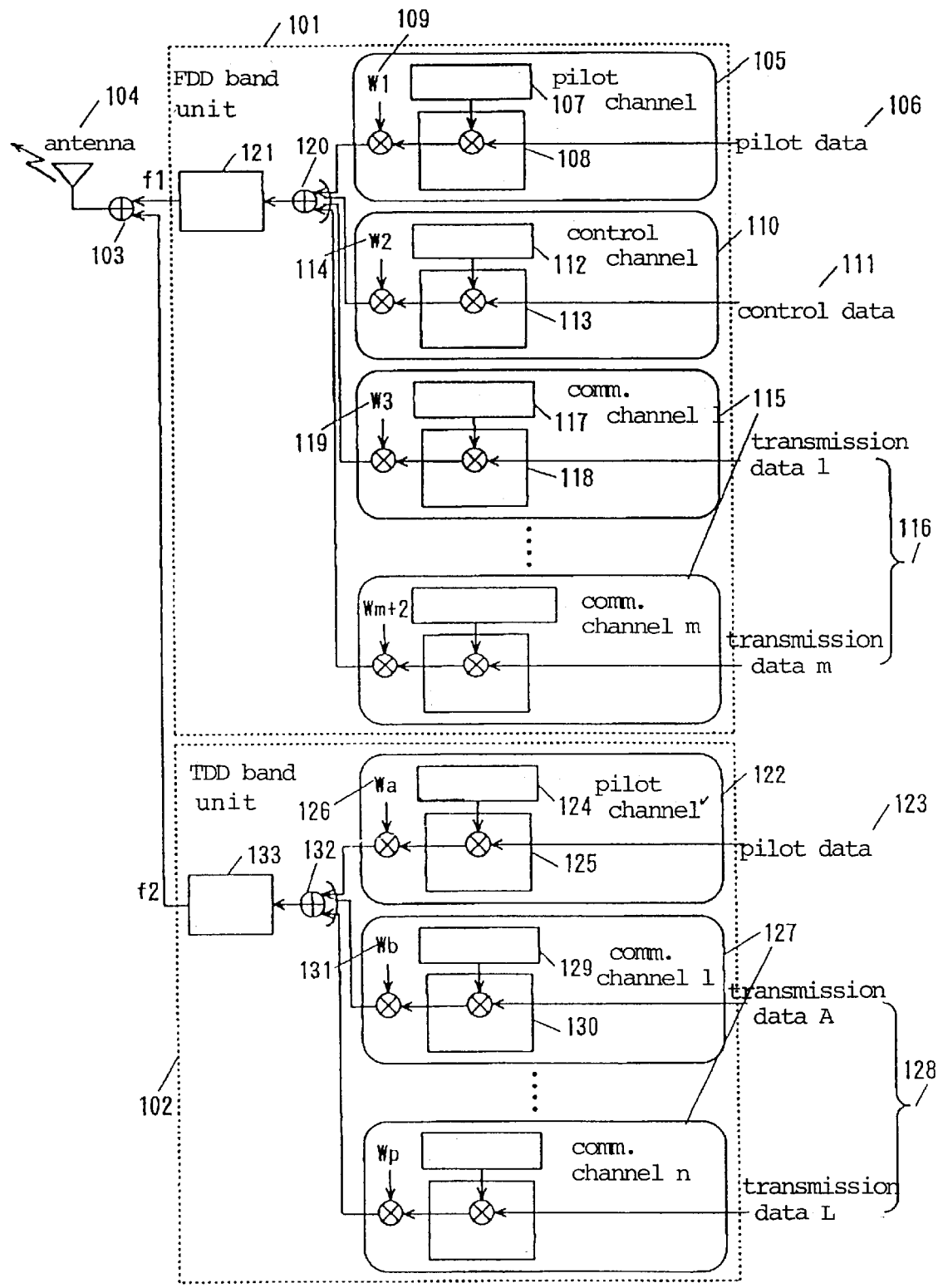
FIG. 1 is a block diagram illustrating a CDMA cellular wireless transmitter as a first specific embodiment of the present invention.

A first specific embodiment is a CDMA cellular wireless transmitter which can operate FDD communication and TDD communication. As shown in FIG. 1, the wireless transmitter comprises an FDD band unit 101 for transmitting multiplexed data at the frequency f1, a TDD band unit 102 for transmitting multiplexed data at the frequency f2, an adder 103 for adding the both, and an antenna 104 for transmitting signals. The FDD band unit 101 comprises a pilot channel 105 for spreading and outputting pilot data 106, a control channel 110 for spreading and outputting control data 111, communication channels 1–m (115) for spreading and outputting respective transmission data 1–m (116), an adder 120 for adding output of the respective channels, and a wireless transmitting portion 121 for converting output of the adder 120 into signals at the frequency f1. The TDD band unit 102 comprises a pilot channel 122 for spreading and outputting pilot data 123, communication channels 1–n (127) for spreading and outputting respective transmission data A–L (128), an adder 132 for adding output of the respective channels, and a wireless transmitting portion 133 for converting output of the adder 132 into signals at the frequency f2. The transmitter is different from the above-mentioned wireless transmitter (FIG. 7) on the point that the TDD band unit 102 does not have a control channel, but is otherwise the same as the above-mentioned wireless transmitter.

In the FDD band unit 101 of the transmitter, the pilot channel 105 spreads the pilot data 106 with a spread circuit 108 using a spread code 1 (107), multiplies the spread data by a weight 109, and then outputs the data. The control channel 110 spreads the control data 111 with a spread circuit 113 using a spread code 2 (112), multiplies the spread data by a weight 114, and then outputs the data. The communication channel 115 spreads the respective transmission data 1–m (116) with respective spread circuits 118 using respective spread codes 117, multiplies the spread data by respective weights 119, and then outputs the data. The data outputted from the respective channels are multiplexed by the multiplexing circuit 120, up converted by the wireless transmitting portion 121, and transmitted from the antenna 104.

In the TDD band unit 102, the pilot channel 122 spreads the pilot data 123 with a spread circuit 125 using a spread code 1 (124), multiplies the spread data by a weight 126, and then outputs the data. The communication channel 127 spreads the respective transmission data A–L (128) with respective spread circuits 130 using respective spread codes 129, multiplies the spread data by respective weights 131, and then outputs the data. The data outputted from the respective channels are multiplexed by the multiplexing circuit 132, up converted by the wireless transmitting portion 133, and transmitted from the antenna 104.

In this way, the wireless transmitter transmits control data only via the control channel for the FDD band when communication is being waited for and communication is started (the circuit is connected). Accordingly, a receiver receives the control data via its control channel for the FDD band, and after the circuit is connected, a switchover to the communication channel for the FDD band or for the TDD band is carried out to transmit/receive data.

In the wireless transmitter, the spread codes used in FDD and TDD may be different from each other. The transmitting antenna for the radio frequency f1 and that for the radio frequency f2 may be separately provided. Further, since the pilot data 106 and 123 do not necessarily have to transmit information, these data may be non-modulated data (all zeros, or, all ones).

In case the ratio of chip rates of the signals outputted in the FDD band and the signals outputted in the TDD band is made to be $2^N$ (N is an integer and $N \leq 0$), a spread circuit can be made to be common to the two bands, or spread circuits for the two bands can be operated with a fundamental clock of $2^N$ times.

In this way, in the wireless transmitter of this specific embodiment, since a control channel is not provided for the TDD band, the circuit scale of the transmission circuit can be reduced, and interference due to the otherwise necessary control channel can be reduced.

Figure 2:
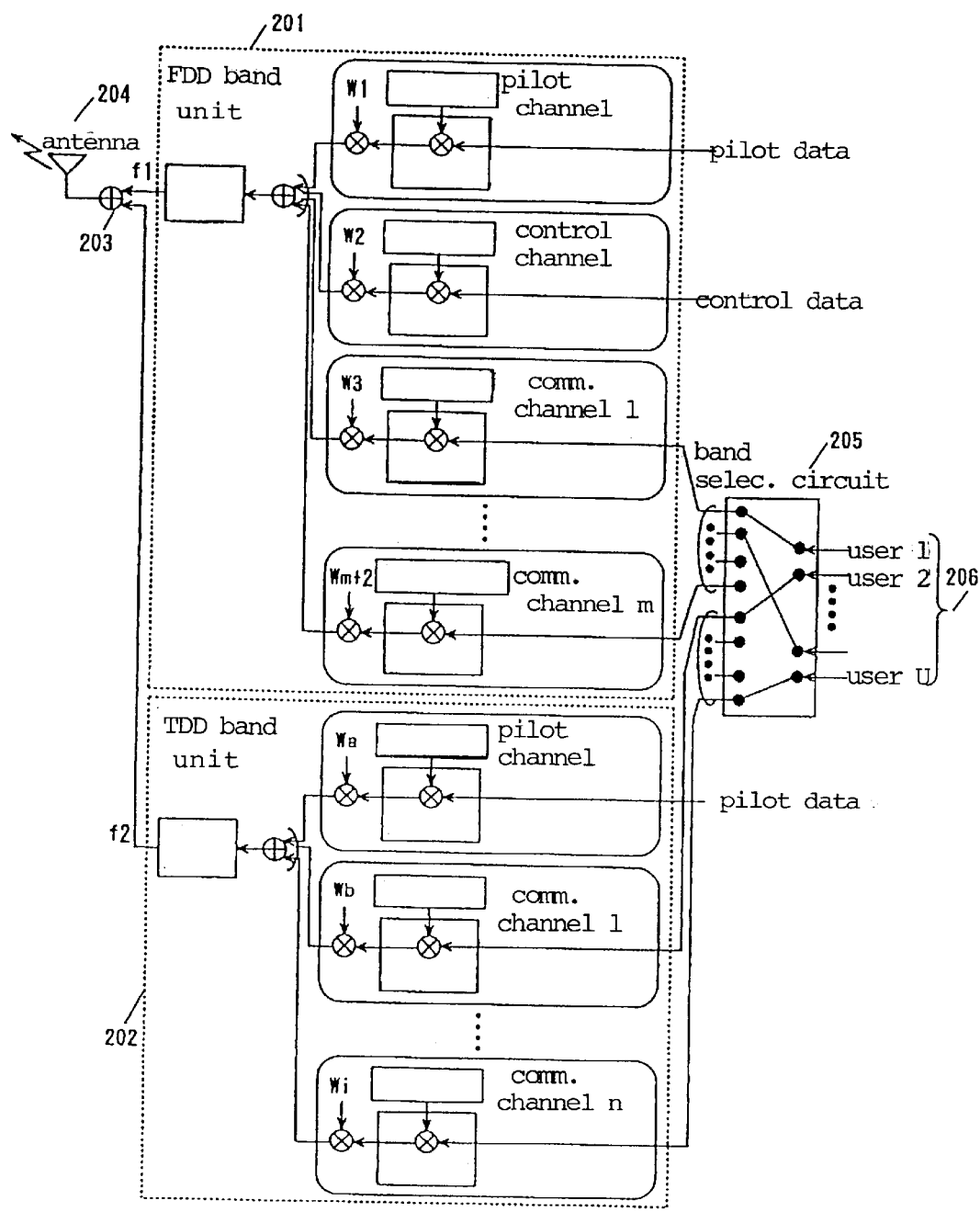
FIG. 2 is a block diagram illustrating a CDMA cellular wireless transmitter as second and seventh specific embodiments of the present invention.

A second specific embodiment is the CDMA cellular wireless transmitter of the first specific embodiment further having a band-switching function. As shown in FIG. 2, the transmitter is provided with a band selection circuit 205 for allotting communication channel signals of users 1–U (206) to either the FDD band or the TDD band. The transmitter is otherwise the same as the first embodiment (FIG. 1).

In the wireless transmitter, in case the users 1–U (206) are connected with the circuit, or in case communication of a user is handed over from a neighboring cell, the band selection circuit 205 allots communication of the users to either the FDD band or the TDD band according to the status of traffic of the respective bands, the circuit quality required by the respective users, and the like.

Transmission data allotted to the FDD band by the band selection circuit 205 is processed by the FDD band unit 201 to be transmitted, while transmission data allotted to the TDD band is processed by the TDD band unit 202 to be transmitted.

In this way, according to this embodiment, by providing the band selection circuit, communication channel data can be allotted to either the FDD band or the TDD band according to the status of traffic of the respective bands, the circuit quality required by the respective users, and the like, and thus, the frequency utilizing efficiency can be improved.

A CDMA cellular wireless transmitter as a third specific embodiment interpolates pilot symbols in communication channel data to be transmitted.

Figure 3:
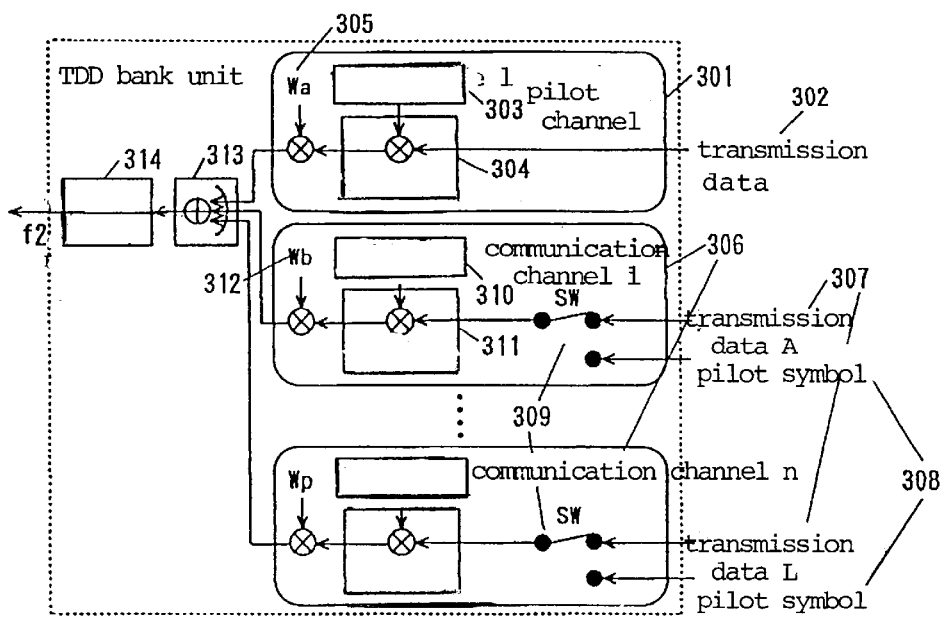
FIG. 3 is a block diagram illustrating a CDMA cellular wireless transmitter as third and eighth specific embodiments of the present invention.

As shown in FIG. 3, the transmitter is provided with switches 309 for outputting pilot symbols 308 with a predetermined period T among respective sequences of transmission data 307. The rest of the TDD band unit, and the FDD band unit are the same as the first specific embodiment (FIG. 1).

In the transmitter, a pilot channel 301 of the TDD band unit spreads transmission data 302 (pilot data) with a spread circuit 304 using a spread code 1 (303), multiplies the spread data by a weight 305, and then outputs the data. In a communication channel 306, the respective switches 309 output the transmission data 307 while outputting pilot symbols 308 with the period T. The respective output of the switches 309 are spread with respective spread circuits 311 using respective spread codes 310, multiplied by respective weights 312, and then outputted.

The output of the respective channels are multiplexed by a multiplexing circuit 313, up converted by a wireless transmitting portion 314, and transmitted.

In the wireless transmitter, since the pilot symbols for synchronous detection are interpolated in the sequences of the transmission data, a receiver can carry out synchronous detection utilizing the pilot symbols, and as a result, the receiver can be less dependent on the pilot channel 301, and thus, the wireless transmitter can lower the power spared for the pilot channel.

In FIG. 3, weights Wb–Wm in the transmission channels are for transmission power control, and weight transmission power among the communication channels. In the wireless transmitter, The value of the weight Wa 305 in the pilot channel is lower than the values of the weights in the communication channels, i.e., Wa<Min[Wb . . . Wm], where Min[Wb . . . Wm] is the minimum value among the weights Wb–Wm.

Figure 4:
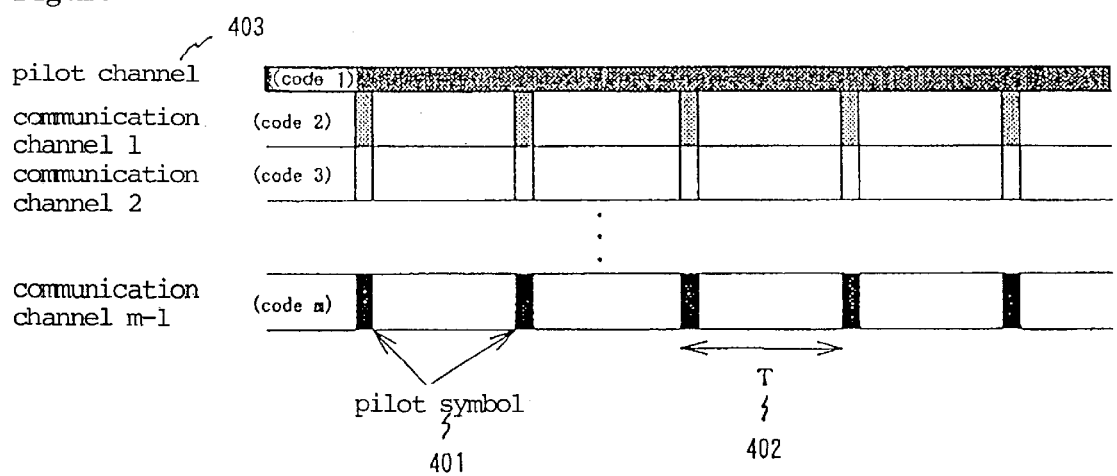
FIG. 4 is a channel format illustrating an example of multiplexing a pilot channel and interpolating pilot symbols in the third and eighth specific embodiments of the present invention.
Figure 5:
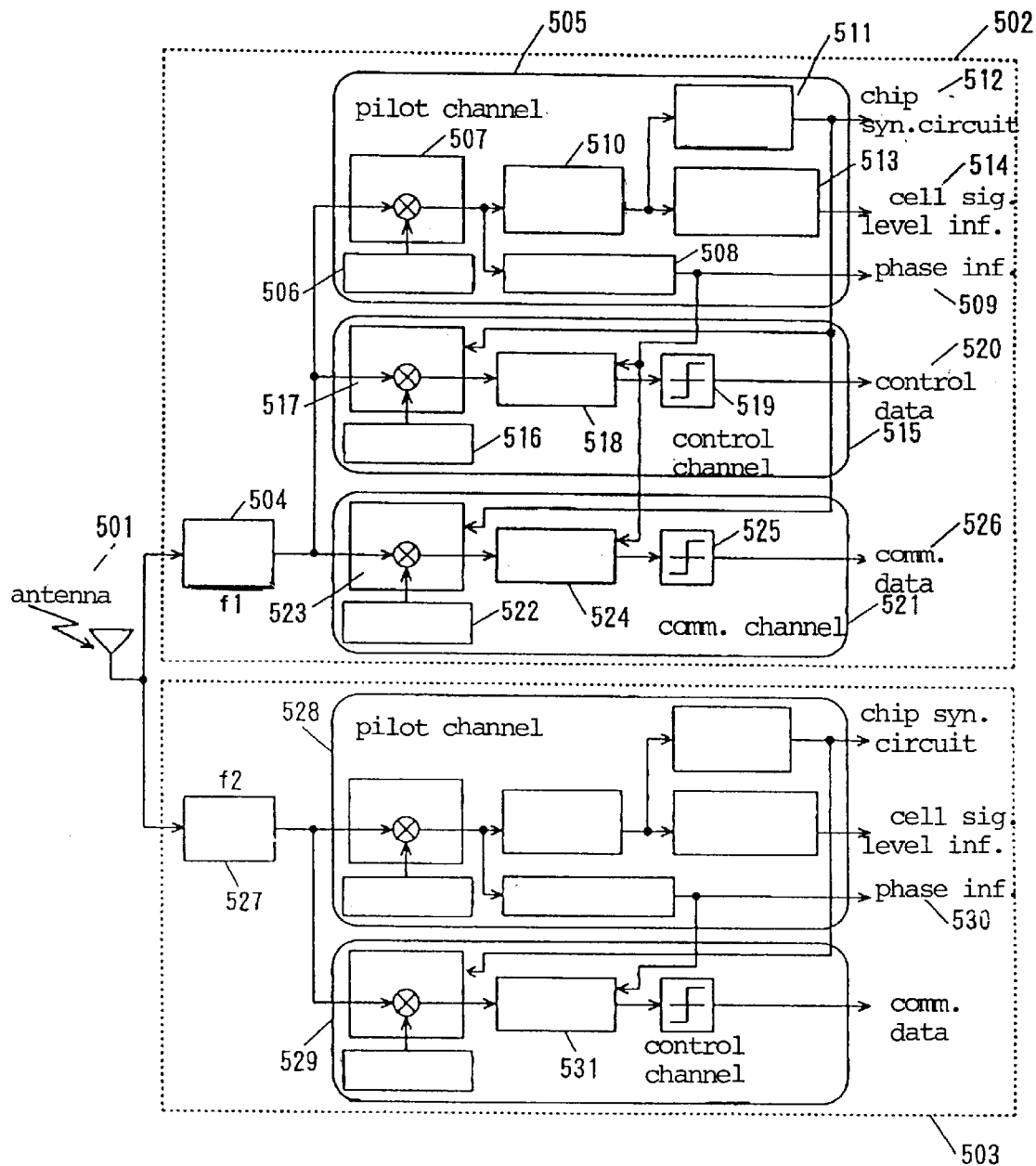
FIG. 5 is a block diagram illustrating a CDMA cellular wireless receiver as a fourth embodiment of the present invention.

FIG. 4 illustrates a channel format in the TDD band according to the third specific embodiment. In the respective communication channels, in addition to the transmission data, there are pilot symbols 401 interpolated with a period T (402). The height (thickness) of each of the channels represents the transmission power. The figure illustrates that, while the transmission power is the same with respect to all the communication channels, the transmission power with respect to a pilot channel 403 is lower than that with respect to the communication channels.

In this way, by providing pilot symbols for the purpose of interpolating-type synchronous detection periodically in the respective communication channels in the TDD band, the pilot channel data is not required to assure high reliability as reference signals for synchronous detection. By providing a weight for transmitting the pilot channel data with lower power than the power with which the communication channel data is transmitted, interference due to the pilot channel can be reduced.

A fourth specific embodiment is a CDMA cellular wireless receiver capable of receiving signals in both of the FDD band and the TDD band. As shown in FIG. 4, the receiver comprises an antenna 501 for receiving signals, an FDD band unit 502 for processing received signals in the FDD band (at the radio frequency f1), and a TDD band unit 503 for processing received signals in the TDD band (at the radio frequency f2). The FDD band unit 502 comprises a wireless receiving portion 504 for down converting received signals, a pilot channel 505 for processing received signals to output phase information 509, chip synchronization signals 512, and cell signal level information 514, a control channel 515 for outputting control data 520, and a communication channel 521 for outputting communication data 526. The TDD band unit 503 comprises a wireless receiving portion 527 for down converting received signals, a pilot channel 528 for processing received signals to output phase information, chip synchronization signals, and cell signal level information, and a communication channel 529 for outputting communication data. The transmitter is different from the above-mentioned wireless transmitter embodying the present invention (FIG. 8) on the point that the TDD band unit 503 does not have a control channel, but is otherwise the same as the above-mentioned wireless transmitter.

In the receiver, signals in the FDD band are processed in the same way as in the receiver shown in FIG. 8. Received signals are down converted by the wireless receiving portion 504. In the pilot channel 505, the correlation circuit 507 despreads using a spread code 506. A phase estimation circuit 508 detects the phase information 509 from the despreaded output to send it to detection circuits 518 and 524 of the control channel 515 and the communication channel 521. In the control channel 515, a correlation circuit 517 despreads using a spread code 2 (516), the detection circuit 518 carries out synchronous detection with regard to the despreaded signals based on the phase information 509, and a binary decision circuit 519 makes a decision to output the control data 520. In the communication channel 521, a correlation circuit 523 despreads using a spread code m (522), the detection circuit 524 carries out synchronous detection with regard to the despreaded signals based on the phase information 509, and a binary decision circuit 525 makes a decision to output the communication data 526.

From the output of the correlator of the pilot channel 505, a power detection circuit 510 operates reception power with respect to each sampling (phase). A chip synchronous circuit 511 outputs the chip synchronization signals 512 by integrating the output of the power detection circuit 510 with respect to a certain time constant. The chip synchronization signals are used to determine the phases of the despreading using the spread codes in the correlation circuit 517 of the control channel 515 and the correlation circuit 523 of the communication channel 521. In case a plurality of cells use the same spread code 1 (506) and transmit pilot channel signals with phase shift, a cell monitor circuit 513 can obtain the cell signal level information 514 from the output of the power detection circuit 510.

It is to be noted that, with regard to the chip synchronization signals 512, it is not necessary to always use the pilot channel signals, and it is obvious that the chip synchronization information may be obtained using output of a correlator of the communication channel formed of a digital matched filter, a plurality of sliding correlator, and the like.

It is also obvious that, to obtain the chip synchronization signals 511, it is not necessarily required to carry out power detection. Further, it is obvious that, in case the system is not one where a plurality of cells use the same spread code 1 (506) and transmit pilot channel signals with phase shift, The construction for obtaining the cell signal level information is unnecessary.

Process in the TDD band unit 503 is basically similar to that in the FDD band unit 502. Signals in the TDD band are down converted by the wireless receiving portion 527, and data of the pilot channel 528 and of the communication channel 529 are processed similarly to signals in the FDD band to be decoded. However, since no control channel exists for the TDD band, no signal is received by the control channel. Therefore, even in case the communication channel for the TDD band is utilized, control data when communication is being waited for and communication is started (the circuit is connected) is received by the control channel for the FDD band, and, after the circuit is connected, the channel is switched to the communication channel for the TDD band and the communication channel for the TDD band transmits/receives data.

In this way, in the wireless receiver of this embodiment, since a receiver for the control channel for the TDD band is eliminated, hardware can be reduced accordingly.

Figure 6:
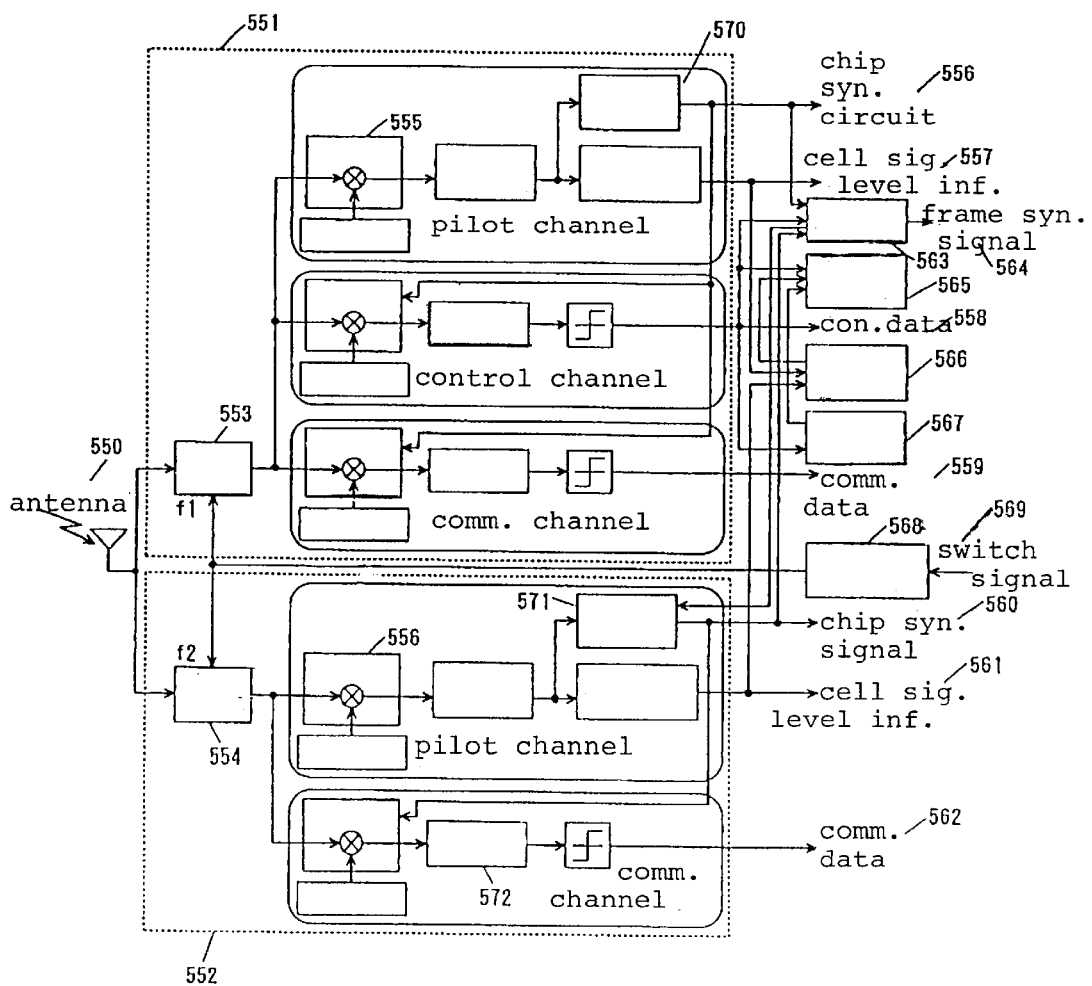
FIG. 6 is a block diagram illustrating a CDMA cellular wireless receiver as fifth, sixth, seventh, and eighth embodiments of the present invention.

As shown in FIG. 6, CDMA cellular wireless receiver as a fifth specific embodiment is provided with the FDD band unit 551 and the TDD band unit 552 the basic construction and operation of both of which are the same as those of the fourth embodiment (however, in FIG. 6, the portions where a phase estimation circuit detects phase information from despreaded output of a correlation circuit 555 and a correlation circuit 556 to send it to detection circuits of a control channel and a communication channel are omitted), with a synchronous circuit 563 for outputting frame synchronization signals 564, a call connecting process circuit 565 for processing call connection until start of communication, and a cell identification process circuit 566 for identifying the nearest cell and sending the information to the call connection process circuit 565 being added (a waiting process circuit 567 and an FDD/TDD switch circuit 568 are not used in this embodiment).

In this receiver, initial synchronization process and process until start of communication are carried out in the FDD band. When the receiver is switched on, the chip synchronization signals 556 found by the pilot channel of the FDD band unit 551 are inputted to the synchronous circuit 563, and cell signal level information 556 is inputted to the cell identification process circuit 566. Further, control data found by the control channel is inputted to the synchronous circuit 563 and the call connection process circuit 565.

The synchronous circuit 563 generates the frame synchronization signals 564 based on the inputted chip synchronization signals 556 and the control data 558. The synchronization signals are also inputted to a chip synchronous circuit 571 of the TDD band unit 552. The cell identification process circuit 566 identifies the nearest cell based on the cell signal level information 557 and sends the information to the call connection process circuit 565. The call connection process circuit 565 carries out, when calling is detected with the control data transmitted from the base station of the cell, process until start of communication.

In case the communication channel for the TDD band is used, during process for starting communication (connecting the circuit), in the TDD band unit 552, chip synchronization signals 560 are found by the pilot channel and outputted to a correlation circuit of the communication channel, and, together with start of communication, decoding of communication data 562 is started. The chip synchronization signals 560 outputted from the pilot channel of the TDD band unit 552 during communication are inputted to the synchronous circuit 563, and the synchronous circuit 563 continues to output the frame synchronization signals 564.

Cell signal level information 561 outputted from the pilot channel of the TDD band unit 552 during communication is inputted to the cell identification process circuit 566, and, based on the information, the cell identification process circuit 566 monitors a handover (switching of cells) during communication. At the end of communication, end process is carried out with the control data as a part of the communication data 562.

As this embodiment, by providing in the wireless receiver means for carrying out initial synchronization process and process until start of communication with the signals in the FDD band and means for carrying out process during communication and process for ending communication with the signals in the TDD band, a receiver for the control channel for the TDD band can be eliminated. In case process until start of communication is carried out in the FDD band and communication is carried out only in the TDD band, a receiver for the communication channel for the FDD band can be eliminated, and the scale of hardware can be reduced accordingly.

A CDMA cellular wireless receiver as a sixth embodiment intermittently receives the control channel data when communication is being waited. As shown in FIG. 6, the receiver is provided with a waiting process circuit 567 for carrying out process when communication is being waited, but is otherwise the same as the fifth embodiment.

In the receiver, when communication is being waited, the FDD band unit 551 intermittently receives the control channel data. The waiting process circuit 567 judges whether its own receiver is called is not. In case it judges that the receiver is called, it sends the information to the call connection process circuit 565. In case the receiver is called, the call connection process circuit 565 processes call connection described in the fifth, and communication starts. After the end of communication in the TDD band, intermittent reception of the control channel data in the FDD band is carried out again for preparing for the next calling.

In this way, in the wireless receiver as the sixth embodiment, since means for carrying out waiting process for intermittent reception only in the FDD band is provided, it is not necessary to provide a control channel for waiting in the TDD band, and hardware can be reduced accordingly. Further, in this receiver, by carrying out intermittent reception, operating time is shortened, and power consumption can be lowered.

A seventh specific embodiment is a CDMA cellular wireless receiver in case the CDMA cellular wireless transmitter of the second embodiment is used as the transmitter.

When the transmitter allots communication channel data to either the FDD band or the TDD band according to the second embodiment, this wireless receiver switches the band of the communication channel to either the FDD band or the TDD band accordingly.

As shown in FIG. 6, the wireless receiver is provided with an FDD/TDD switch circuit 568 for switching the band of the communication channel to either the FDD band or the TDD band according to a switch signal 569 for instructing band switch when the circuit is connected. The receiver is otherwise the same as the sixth embodiment.

In the receiver, when the transmitter allots communication the channel data to either the FDD band or the TDD band and transmits communication data, the FDD/TDD switch circuit 568 receives the switch signal 569 generated when the circuit is connected, and operates either the wireless transmitting portion 553 or the wireless transmitting portion 554 so as to switch to the designated band. As a result, decoded data 559 or 562 is obtained.

Here, in case the transmitter makes the chip synchronization and the frame synchronization of the signals outputted in the FDD band and the TDD band align with each other before transmission, the chip synchronization signals 556 and 560 are the same on the side of the receiver. Thus, only one circuit can be used both as the chip synchronous circuits 570 and 571. FURTHER, the frame synchronization signal 564 is the same in the two bands. Therefore, when received signals are (or the channel is) is switched between the FDD band and the TDD band, it is not necessary to obtain again the chip synchronization and the frame synchronization.

In this way, in the wireless receiver as the seventh embodiment, by providing the FDD/TDD switch circuit, the receiver is only required to receive data in either the FDD band or the TDD band. Since it is not necessary for the receiver to always receive signals in the two bands, power consumption can be lowered. Further, by providing means for making the chip synchronization and the frame synchronization align with each other before transmission, the circuit for the chip synchronization can be made common and the circuit for the frame synchronization can be made common, and therefore, when received signals are switched between the FDD band and the TDD band, it is not necessary to obtain again the chip synchronization and the frame synchronization.

(Eighth Embodiment)

An eighth specific embodiment is a CDMA cellular wireless receiver in case the CDMA cellular wireless transmitter of the third embodiment is used as the transmitter.

When the transmitter interpolates pilot symbols in the communication channel transmission data to transmit according to the third embodiment, this wireless receiver eliminates a phase estimation circuit for the TDD band.

The receiver is constructed as shown in FIG. 6., and does not have a phase estimation circuit in the pilot channel of the TDD band unit 552.

As described in the above, FIG. 4 illustrates the channel format in the TDD band of the transmitter. In the respective communication channels, in addition to the transmission data, there are pilot symbols 401 interpolated with a period T (402). The height (thickness) of each of the channels representing the transmission power of each of the channels is the same with respect to all the communication channels, while the transmission power with respect to the pilot channel 403 is lower than that with respect to the communication channels. This is because, since the pilot channels are interpolated in the communication channel data, the pilot channel data is not required to assure high reliability as reference signals for synchronous detection.

In the wireless receiver, as shown in FIG. 6, only the chip synchronization signals 560 and the cell signal level information 561 are detected in the pilot channel for the TDD band. It is to be noted that, since the chip synchronization signals 560 and the cell signal level information 561 are found by integrating the output of the power detection circuit in the chip synchronous circuit 571 and a cell monitor circuit, even if the transmission power with respect to the pilot channel is low, no problem arises. A detection circuit 572 of the communication channel independently carries out synchronous detection of the received data using the interpolated pilot symbols.

With this wireless receiver, a phase estimation circuit in the pilot channel for the TDD band can be eliminated, and the construction of the circuit can be simplified. The transmitter can lower the transmission power of the pilot channel, and thus, interference due to the pilot channel can be reduced.

As is clear from the above description, in CDMA cellular wireless communication equipment, a control channel for a TDD band can be eliminated, and the circuit scale of a transmitter and a receiver can be reduced. Further, by eliminating the control channel, interference with a communication channel can be reduced, and the communication quality can be improved.

What is claimed is:

1. A wireless transmitter for a spread spectrum-direct sequence CDMA cellular wireless system operating FDD (Frequency Division Duplex) communication and TDD (Time Division Duplex) communication, said transmitter comprising:
   means for outputting pilot channel signals in an FDD band;
   means for outputting control channel signals in said FDD band, wherein said control channel signals are common to both of said FDD band and TDD band;
   means for outputting communication channel signals in said FDD band;
   means for outputting pilot channel signals in a TDD band; and
   means for outputting communication channel signals in said TDD band;
   wherein said wireless transmitter does not have means for outputting control channel signals in said TDD band.

2. A wireless transmitter for a spread spectrum-direct sequence CDMA cellular wireless system operating a FDD (Frequency Division Duplex) communication band and a TDD (Time Division Duplex) communication band comprising:
   means for outputting pilot channel signals in an FDD band;
   means for outputting control channel signals in said FDD band;
   means for outputting communication channel signals in said FDD band;
   means for outputting pilot channel signals in a TDD band; and
   means for outputting communication channel signals in said TDD band;
   wherein said control channel signals are common in both of FDD band and TDD band.

3. The CDMA cellular wireless transmitter of claim 2 further comprising band selection means for alloting communication channel signals of a user to either said FDD band or said TDD band when said user connects with said transmitter or when communication is handed over.

4. The CDMA cellular wireless transmitter of claim 2 wherein the chip synchronization or the frame synchronization of said signals outputted in said FDD band and said TDD band align with each other.

5. A spread spectrum CDMA cellular wireless communication system according to claim 2, wherein 90 MHz between 2110–2200 MHz and 90 MHz between 1885–1975 MHz are each assigned to the FDD communication band and 50 MHz between 1975–2025 MHz is assigned to the TDD communication band.

6. A wireless transmitter for a spread spectrum-direct sequence CDMA cellular wireless system operating a FDD (Frequency Division Duplex) communication band and a TDD (Time Division Duplex) communication band, said transmitter comprising:
   means for outputting pilot channel signals in an FDD band;
   means for outputting control channel signals in said FDD band;
   means for outputting communication channel signals in said FDD band;
   means for outputting pilot channel signals in a TDD band; and
   means for interpolating pilot symbols in said communication channel signals outputted in said TDD band,
   wherein said pilot channel signals outputted in said TDD band are transmitted with lower power than the power with which said communication channel signals are transmitted.

7. A wireless transmitter for a spread spectrum-direct sequence CDMA cellular wireless system operating a FDD (Frequency Division Duplex) communication band and a TDD (Time Division Duplex) communication band comprising:
   means for outputting pilot channel signals in an FDD band;
   means for outputting control channel signals in said FDD band;
   means for outputting communication channel signals in said FDD band; and
   means for outputting pilot channel signals in a TDD band;
   wherein the ratio of chip rates of said signals outputted in said FDD band and said signals outputted in said TDD band align with each other.

8. A wireless receiver for a spread spectrum-direct sequence CDMA cellular wireless system operating a FDD (Frequency Division Duplex) communication band and a TDD (Time Division Duplex) communication band comprising:
   means for receiving pilot channel signals in an FDD band;
   means for receiving control channel signals in said FDD band;
   means for receiving communication channel signals in said FDD band;
   means for receiving pilot channel signals in a TDD band; and
   means for receiving communication channel signals in said TDD band;
   wherein said control channel signals are common in both the FDD band and TDD band.

9. The CDMA cellular wireless receiver of claim 8 further comprising means for carrying out initial synchronization process and process until start of communication with said signals in said FDD band and means for carrying out process during communication and process for ending communication with said signals in said TDD band.

10. The CDMA cellular wireless receiver of claim 8 further comprising means for intermittently receiving said control channel signals in said FDD band, thereby carrying out waiting process with said signals in said FDD band.

11. Wireless communication apparatus for a spread spectrum-direct sequence CDMA cellular wireless system operating in a FDD (Frequency Division Duplex) communication band and a TDD (Time Division Duplex) communication band, said apparatus comprising:

(a) a transmitter comprising:
   means for outputting pilot channel signals in an FDD band;
   means for outputting control channel signals in said FDD band;
   means for outputting communication channel signals in said FDD band; and
   means for outputting pilot channel signals in said TDD band,
   wherein said control channel signals are common in both the FDD band and TDD band; and (b) a receiver comprising:
   means for receiving pilot channel signals in said FDD band;
   means for receiving control channel signals in said FDD band;
   means for receiving communication channel signals in said FDD band;
   means for receiving pilot channel signals in said TDD band; and
   means for receiving communication channel signals in said TDD band,
   wherein said control signals are common in both the FDD band and TDD band.

12. The CDMA cellular wireless communication apparatus of claim 11 wherein said transmitter allots communication channel signals of a user to either said FDD band or said TDD band when said user connects with said apparatus or when communication is handed over and said receiver receives communication channel signals in either said FDD band or said TDD band designated by said transmitter.

13. The CDMA cellular wireless communication apparatus of claim 11 wherein said transmitter further comprises means for making said chip synchronization of said signals outputted in said FDD band and said TDD band align with each other before transmission and said receiver further comprises means for carrying out chip synchronization process.

14. The CDMA cellular wireless communication apparatus of claim 11 wherein said transmitter further comprises means for making said frame synchronization of said signals outputted in said FDD band and said TDD band align with each other before transmission and said receiver further comprises means for carrying out frame synchronization process.

15. A wireless communication apparatus for a spread spectrum-direct sequence CDMA cellular wireless system operating in an FDD (Frequency Division Duplex) communication band and TDD (Time Division Duplex) communication band a transmitter thereof comprising:
   means for outputting pilot channel signals in an FDD band;
   means for outputting control channel signals in an FDD band;
   means for outputting communication channel signals in an FDD band; and
   means for outputting pilot channel signals in a TDD band;
and a receiver thereof comprising:
   means for receiving pilot channel signals in said FDD band;
   means for receiving control channel signals in said FDD band;
   means for receiving communication channel signals in said FDD band;
   means for receiving pilot channel signals in said TDD band,
   wherein said transmitter further comprises means for interpolating pilot symbols in said communication channel signals outputted in said TDD band and said receiver further comprises means for carrying out interpolating-type synchronous detection using pilot symbols in receiving communication channel signals.

16. A wireless receiver for a spread spectrum-direct sequence CDMA cellular wireless system operating a FDD (Frequency Division Duplex) communication band and a TDD (Time Division Duplex) communication band, said receiver comprising:
   means for receiving pilot channel signals in an FDD band;
   means for receiving control channel signals in said FDD band;
   means for receiving communication channel signals in said FDD band;
   means for receiving communication channel signals having pilot symbols interpolated therein in a TDD band; and
   means for receiving pilot channel signals in said TDD band, wherein said pilot channel signals in said TDD band have lower transmission power than the transmission power of said communication channel signals.

17. A wireless receiver for a spread spectrum-direct sequence CDMA cellular wireless system operating a FDD (Frequency Division Duplex) communication band and a TDD (Time Division Duplex) communication band, said receiver comprising:
   means for receiving pilot channel signals in said FDD band;
   means for receiving control channel signals in said FDD band;
   means for receiving communication channel signals having pilot symbols interpolated therein in said FDD band; and
   means for receiving pilot channel signaLS in a TDD band;
   wherein the ratio of chip rates of said signals in said FDD band and said signals of said TDD band align with each other.

* * * * *